J. C. HOSTLER.
POULTRY FEEDER.
APPLICATION FILED MAR. 27, 1922.

1,425,013.  Patented Aug. 8, 1922.

Inventor
John C. Hostler

By Watson E. Coleman
Attorney

UNITED STATES PATENT OFFICE.

JOHN C. HOSTLER, OF ALTOONA, PENNSYLVANIA.

POULTRY FEEDER.

1,425,013.    Specification of Letters Patent.    Patented Aug. 8, 1922.

Application filed March 27, 1922. Serial No. 547,245.

*To all whom it may concern:*

Be it known that I, JOHN C. HOSTLER, a citizen of the United States, residing at Altoona, in the county of Blair and State of Pennsylvania, have invented certain new and useful Improvements in Poultry Feeders, of which the following is a specification, reference being had to the accompanying drawings.

This invention relates to poultry feeders, and has for its object to provide a feeder constructed to permit the poultry to readily gain accesss to the feed.

Another object is to provide a feeder having a number of feed receiving receptacles, with means to protect the feed and yet permit the poultry to readily obtain the feed.

It is a further object of the invention to provide a feeder of this character wherein certain of the feed receiving receptacles are provided with shields adapted to prevent the entrance of foreign matter into the feed receptacles, the shields being rotatable to prevent the poultry from roosting thereon.

A still further object of the invention is to provide a poultry feeder with a rotatable trough with means for holding said trough in position for use and in its inverted position for cleaning.

With these and other objects in view, the invention consists in the improved construction and arrangement of parts to be hereinafter more particularly described, fully claimed and illustrated in the accompanying drawings, in which:—

Figure 1:
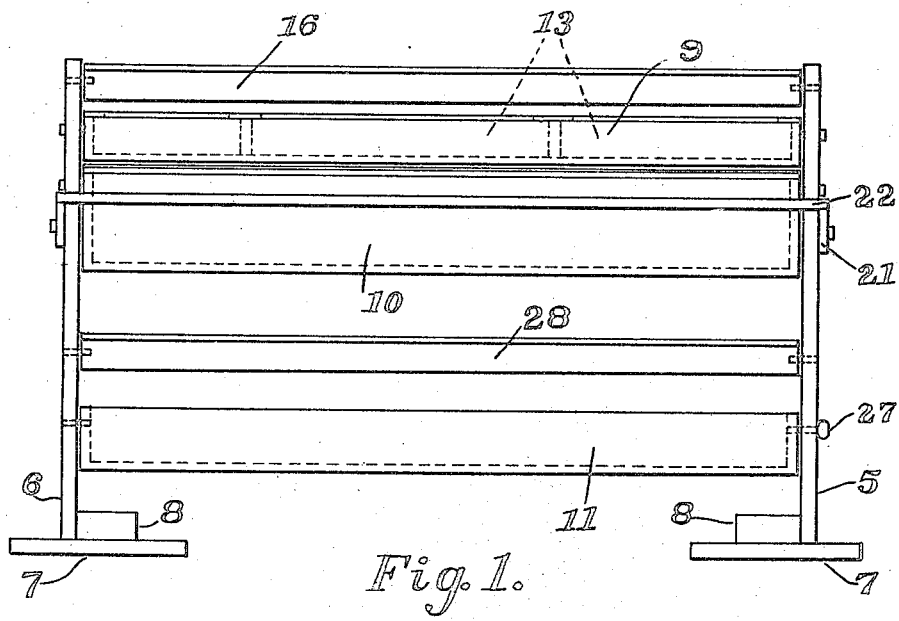
Figure 1 is a side elevation of a poultry feeder, constructed in accordance with an embodiment of the invention.
Figures 2, 3:
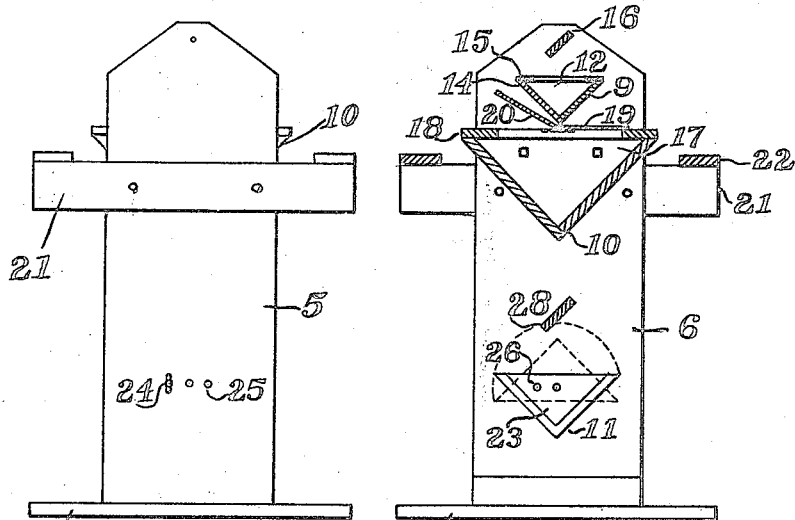
Figure 2 is an end elevation.
Figure 3 is a transverse sectional view.

Referring to the drawings, 5 and 6 designate the main supporting standards of the feeder, each standard being provided with a base 7, a bracing member 8 being carried by each base to properly brace the standards. Disposed between, and connecting the standards 5 and 6 to each other, is a plurality of troughs 9, 10 and 11. The trough 9 is substantially V-shaped in cross section and has its end portions 12 bolted to the upper portions of the standards, below the upper extremities of the standards, so that the trough may be readily disengaged from the standards when necessary. It will be noted that the trough 9 is disposed inwardly of the edges of the standards, said trough having a plurality of compartments 13 adapted to hold various materials for use in the feeding of poultry, such as grit, charcoal, and oyster shell. Each longitudinal edge 14 of the trough 9 is provided with a longitudinally extending strip 15, said strip extending inwardly to serve as a guard and prevent unnecessary waste of the material when the poultry is feeding. In order to protect the contents of the trough 9 from dirt and like foreign matter, a shield 16 is disposed above the trough adjacent the upper extremity of the standards 5 and 6. The ends of the shield are pivoted to the standards so that in case the poultry endeavors to roost upon the shield, the same will rotate so that the contents of the trough will at all times be protected.

The trough 10 is considerably larger than the trough 9, but similar in construction, that is, V-shaped in cross section, the end portions 17 of the trough 10 being bolted to the standards closely adjacent the bottom of the trough 9. The trough 10 is intended to receive dry mash, the longitudinal edges of the trough projecting beyond the edges of the standards. The longitudinal edges of the trough 10, similar to the trough 9, are provided with longitudinally extending guard strips 18 which prevent waste of material. In the breeding of poultry it is desirable that the dry mash trough be closed at certain times. In view of this, lids 19 and 20 are provided, each lid being hinged to the end portions of the trough 10 at the confronting inner edges of the lids, so that the trough 10 may be opened from either side of the feeder, the lids being arranged to rest upon the guard strips 18. Carried by each of the standards 5 and 6 and having its ends extending beyond the edges thereof, is a supporting member 21. A supporting strip 22 is connected to the ends of the supporting members 21, and serves as a platform to permit the poultry to gain access to either the trough 9 or trough 10, the members 21 being positioned so that the poultry may readily gain access to either of the troughs without standing upon the edge of the trough.

A trough 11 is disposed beneath the trough 10 and adjacent the base member 7, the end portions 23 of the trough 11 being pivoted to the members 5 and 6 and rotatable. The trough 11, similar to the troughs 9 and 10, is substantially V-shaped in cross section. By pivoting the trough 11 it is possible to rotate the same for cleaning. This trough is intended to contain wet mash. In order to prevent accidental rotation of the trough, and waste of the contents thereof, one of the standards is provided with openings 24 and 25, disposed in spaced relation to the pivot opening, the adjacent end of the trough 11 being provided with an opening 26 adapted to register with either one of the openings 24 and 25, a pin 27 being disposed in said registering openings to hold the trough. When the pin is disposed in the opening 24, the trough is held in its upright position for use, and when disposed in the opening 25 and registering with the opening 26, the trough is held in its inverted position. By the provision of only two openings or holes in the end portions of the trough 11, waste of the material is prevented. To protect the contents of the trough 11, a shield 28 is pivoted at its ends to the standards 5 and 6, the shield 28, similar to the shield, 16, being rotatable to prevent roosting of the poultry upon the shield. It will be noted that the shield 28 is disposed a sufficient distance from the trough 11 so as to permit the trough to be rotated for cleaning.

From the foregoing it will be readily seen that this invention provides a novel form of feeder, wherein means are provided for holding all kinds of materials used in the feeding of poultry, the feeder being of a size so that the poultry can readily obtain the feed and yet is so constructed that roosting upon the feeder is prevented. In addition to this, it will be noted that the only means of connection between the members 5 and 6 are the troughs which are bolted to said members. The remaining parts of the feeder are likewise detachably connected so that the entire feeder may be readily disassembled and disposed in a compact form for shipping and reassembled by an unskilled person. I of course do not wish to be limited to the precise arrangement as herein described, as minor changes may be made, such as changing the trough from V-shaped to U-shaped, without departing from the scope of the claims.

What is claimed is:—

1. A feeder comprising a pair of spaced supporting standards, troughs connecting the standards to each other, said troughs being disposed one above the other, a shield rotatably mounted above the top trough, covers hinged at their confronting inner edges to the intermediate trough, a shield rotatably mounted between the standards, beneath the last mentioned trough, and a movable trough rotatably mounted beneath the last mentioned trough and shield, and means for holding said rotatable trough in its upright or inverted position.

2. A feeder comprising a pair of spaced supporting standards, troughs connecting the standards to each other, said troughs being disposed one above the other, a shield rotatably mounted above each of the end troughs, covers hinged at their confronting edges to the intermediate trough, supporting arms carried by the standards, the ends of said arms projecting beyond the sides of the standards, and platforms connected to and supported by said supporting arms.

In testimony whereof I hereunto affix my signature.

JOHN C. HOSTLER.